(12) United States Patent
Schwetzler (10) Patent No.: US 8,181,912 B2
(45) Date of Patent: May 22, 2012

(54) ENGINE POD FOR AN AIRCRAFT WITH A VORTEX GENERATOR ARRANGEMENT

(75) Inventor: Detlev Schwetzler, Delmenhorst (DE)

(73) Assignee: Airbus Deutschland GmbH, Hamburg (DE)

( * ) Notice: Subject to any disclaimer, the term of this patent is extended or adjusted under 35 U.S.C. 154(b) by 195 days.

(21) Appl. No.: 12/454,922

(22) Filed: May 26, 2009

(65) Prior Publication Data

US 2009/0289149 A1    Nov. 26, 2009

Related U.S. Application Data

(60) Provisional application No. 61/056,038, filed on May 26, 2008.

(30) Foreign Application Priority Data

May 26, 2008   (DE) .......................... 10 2008 025 152

(51) Int. Cl.
*B64C 23/06* (2006.01)
*B64D 29/00* (2006.01)

(52) U.S. Cl. ................... 244/199.1; 244/53 R (58) Field of Classification Search .................. 244/198, 244/199.1, 199.2, 199.3, 199.4, 200.1, 130
See application file for complete search history.

(56) References Cited

U.S. PATENT DOCUMENTS

| 3,744,745 A | 7/1973 | Kerker et al. |
| 4,540,143 A * | 9/1985 | Wang et al. .................... 244/130 |

\* cited by examiner

*Primary Examiner* — Tien Dinh
*Assistant Examiner* — Nicholas McFall
*(74) Attorney, Agent, or Firm* — Collard & Roe, P.C.

(57) ABSTRACT

An engine pod for an aircraft has one side which features several fin-shaped vortex generators such that the overall vorticity field generated by the vortex generators extends over an increasing airfoil area in the wingspan direction as the angle of attack increases. The first vortex generator lies within a positioning corridor that is situated between two boundary lines. The origin and end points, respectively, of the first boundary line are the points on the circumference of the engine pod with the circumferential engine pod angle phi=35 degrees and 25 degrees and the longitudinal engine pod coordinate X=L/4 and L·⅔. The origin and end points, respectively, of the second boundary line are the points on the circumference of the engine pod with the circumferential engine pod angle phi=90 degrees and 55 degrees and the longitudinal engine pod coordinate X=L/4 and L·⅔.

13 Claims, 5 Drawing Sheets

ENGINE POD FOR AN AIRCRAFT WITH A VORTEX GENERATOR ARRANGEMENT

CROSS REFERENCE TO RELATED APPLICATIONS

Applicant claims priority under 35 U.S.C. §119 of U.S. Provisional Patent Application Ser. No. 61/056,038 filed on May 26, 2008 and German Application No. 10 2008 025 152.6 filed on May 26, 2008.

The invention pertains to a vortex generator to be mounted on an exterior airflow surface of an aircraft, as well as to an engine pod for an aircraft with a vortex generator arrangement.

The maximum attainable lift during the takeoff and landing phases is of particular importance with respect to the efficiency of an aircraft, especially a transport or commercial aircraft with high takeoff weight. This maximum attainable lift is dependent on the size and the geometry of the airfoil and limited by the flow separation on the upper side of the wing profile that begins as the angle of attack of the aircraft increases. In order to increase the maximum attainable lift, it is common practice to provide high-lift devices in the form of slats or leading-edge flaps on the front side of the airfoil and in the form of trailing-edge flaps on the rear side of the airfoil. An advantageous configuration of these lift elements makes it possible to shift the beginning of the flow separation on the wing toward significantly greater angles of attack.

Another effective measure for shifting the maximum attainable lift toward even greater angles of attack consists of generating vorticity fields by means of suitably designed vortex generators on the upper side of the airfoil, wherein these vorticity fields grow in intensity as the angle of attack increases. One suitable location for arranging such vortex generators is the exterior of the engine pods for engines arranged on the airfoil. Such vortex generators are known as "pod-strakes," "chines" or "nacelle-strakes" and, if arranged optimally, generate a powerful vortex at considerable angles of attack, wherein said vortex extends over the wing and delays the flow separation at this location or on an upstream slat until the angle of attack increases accordingly.

According to U.S. Pat. No. 4,540,143, at least one combination of a fin-shaped vortex generator and a stall fence of identical height seamlessly arranged directly adjacent thereto is respectively provided on one or both sides of the engine pod depending on the respective application. Such combinations of fin-shaped vortex generators and a stall fence not only make it possible to generate one or more largely confined vortices, but also to restrict the propagation of a flow separation in the wingspan direction that is caused by the upper leading edge of the engine pod and extends from this upper leading edge over the wing, namely by generating one or more largely confined vortices.

U.S. Pat. No. 3,744,745 proposes to arrange one respective vortex generator on each side of the engine pod. This is intended to intensify the "downwash" flow field.

The invention is based on the objective of developing a vortex generator arrangement that improves the lift of the airfoil, particularly at increasing angles of attack.

This objective is attained with the characteristics of the independent claims. Other embodiments are defined in the dependent claims referring thereto.

The invention proposes an engine pod with an arrangement of vortex generators that is designed in such a way that it subjects the flow on the exterior airflow surface to vortexing transverse to the flow direction over the most extensive area possible.

According to the invention, it is not intended to influence the flow based on flow disruptions or flow separations originating from the leading edge of the engine pod as it is the case in the state of the art. The inventive measures are rather intended to subject the flow above the airfoil to vortexing over the most extensive area possible referred to the wingspan direction. According to the invention, this alters the boundary layer in a laminar area above the airfoil. A wing with the inventive vortex generators surprisingly makes it possible to realize a greater angle of attack and therefore a higher maximum lift of the entire wing.

The pertinent state of the art does not suggest that this effect occurs and that this measure surprisingly improves the lift, particularly at increasing angles of attack, without disadvantageously affecting the drag while cruising.

It is known to provide a single vortex generator on the side of the engine or the engine pod that faces the fuselage in different types of aircraft such as those designated A320, A340, B777 and B737. It is also known to respectively provide one individual vortex generator on each side of the engine or the engine pod from the aircraft designated DC10, A321, A319 and A318. One disadvantage of the known arrangement can be seen in that the vortex generated by the vortex generator is only effective in a very limited area referred to the wingspan direction, usually in the immediate vicinity of the engine pylon, due to the three-dimensional characteristic of the flow field.

The objective of the invention is attained with an engine pod for an aircraft that features a pod housing with a first and a second side and several fin-like vortex generators that are arranged on one or both sides of the pod housing in such a way that the overall vorticity field generated by said vortex generators extends over an increasing airfoil area in the wingspan direction as the angle of attack increases in order to improve the maximum lift.

In this context, the term engine pod refers to an engine pod for accommodating an engine. Consequently, the engine pod does not have to feature the engine.

The first and the second side of the pod housing are the two sides that lie opposite of one another with respect to the engine pylon, i.e., the respective side that faces the aircraft fuselage and the respective side that is directed away from the aircraft fuselage.

The air flowing around the pod housing is subjected to vortexing over a wide area by the fin-shaped vortex generators. The fin shape of the vortex generators is characterized in that the outer contour of the vortex generator that protrudes from the pod housing is realized continuously and in an ascending fashion in the entire area between the point of origin and the end point of the outer contour.

In this case, the vortex generators may be arranged, in particular, on the side of the pod housing that faces the fuselage.

According to another embodiment of the invention, an engine pod is provided, on which at least one fin-shaped vortex generator is arranged on the second of the two sides of the pod housing.

According to one embodiment of the invention, it would also be possible to provide an engine pod, on which several fin-shaped vortex generators are arranged on both sides of the pod housing.

If several vortex generators are arranged on one side of the pod housing, the invention proposes that the foremost point of a first vortex generator lies within a positioning corridor that is situated between two boundary lines, wherein the point of origin of the first boundary line is the point on the circumference of the engine pod with the circumferential engine pod angle phi=35 degrees and the longitudinal engine pod coordinate X=L/4, the end point of the first boundary line is the point on the circumference of the engine pod with the circumferential engine pod angle phi=25 degrees and the longitudinal engine pod coordinate X=L·⅔, the point of origin of the second boundary line is the point on the circumference of the engine pod with the circumferential engine pod angle phi=90 degrees and the longitudinal engine pod coordinate X=L/4 and the end point of the second boundary line is the point on the circumference of the engine pod with the circumferential engine pod angle phi=55 degrees and the longitudinal engine pod coordinate X=L·⅔.

The first vortex generator may, in particular, be the vortex generator that is situated in the position with the smallest angle phi, i.e., the respective topmost vortex generator.

The boundary lines extend along the outer circumference or on the outer circumferential surface of the engine pod and respectively consist of the shortest line between their respective point of origin and their end point.

It would furthermore be possible to arrange a second vortex generator underneath the first vortex generator by a circumferential engine angle phi=10 to 30 degrees.

If two or more vortex generators are provided, two respectively adjacent vortex generators are respectively arranged such that they overlap in the longitudinal direction.

The longitudinal direction of the vortex generators may be angled relative to the longitudinal axis of the engine pod by delta-theta=0 to 10 degrees.

In its connecting region or intersecting region with the exterior airflow surface of the pod housing, each vortex generator has a length that extends in the longitudinal direction of the vortex generator. The outer contour of the vortex generator that protrudes from the exterior airflow surface may be realized in such a way that it extends in a continuously ascending fashion from the exterior airflow surface of the pod housing to its maximum height at the rear end of the respective vortex generator above the connecting region.

In one special application, the outer contour of at least one vortex generator may be realized in the form of a straight line.

In all embodiments of the proposed vortex generators, the ratio between the overall length LG and the maximum height HG of the vortex generator may lie between 1.4 and 3.6. Referred to the length of the engine pod, the overall length LG of the vortex generator may also lie between 0.1 and 0.15 in this case.

In another embodiment of the vortex generator, the outer contour of the vortex generator that protrudes from the exterior airflow surface may, referred to the geometric path of the connecting region in the longitudinal direction of the vortex generator, be defined by the function $Y=HG \cdot [1-(LG-X)^2/LG^2]$, wherein:

X is the longitudinal coordinate of the vortex generator with an overall length LG of the vortex generator and Y is the vertical coordinate of the vortex generator with a maximum height HG of the vortex generator relative to the exterior airflow surface (A) at the longitudinal coordinate X=LG, and wherein the outer contour that protrudes from the exterior airflow surface lies in an area that corresponds to ±10% of the Y-value resulting from the function.

The surface of the fins forming the vortex generators can generally be arranged radially referred to the engine pod.

Embodiments of the invention are described below with reference to the enclosed drawings, in which.

Figure 1:
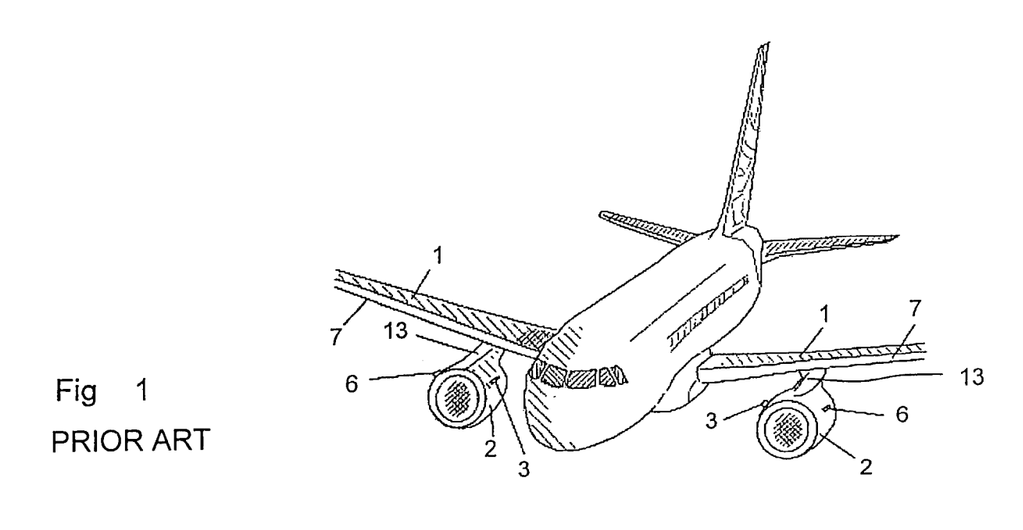
FIG. 1 shows a perspective representation of a commercial aircraft that is provided with a vortex generator arrangement according to the state of the art on the respective engine pod.

FIG. 1 shows an oblique front view or perspective representation of an aircraft, the engine pods of which are provided with vortex generators according to the state of the art. The aircraft features an airfoil 1, wherein lift-increasing elements in the form of respective slats 7 are provided on the leading edge of the airfoil 1. In addition, engine pods 2 that respectively accommodate one engine are arranged on the airfoil 1 underneath the leading wing edge. The engine pods 2 are structurally connected to the airfoil 1 by means of respective engine pylons 13.

Figure 2:
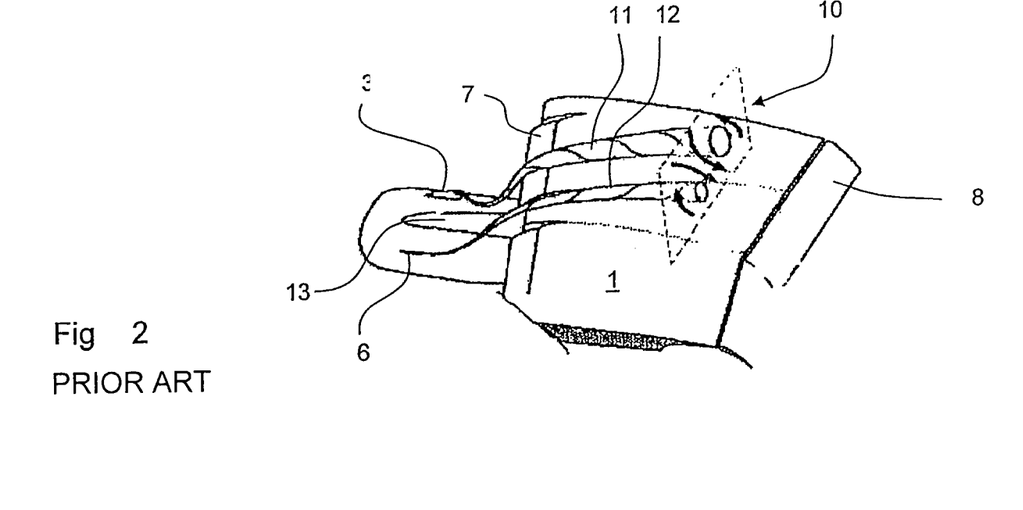
FIG. 2 shows a perspective representation of part of a wing with an engine pod that is provided with a vortex generator arrangement according to the state of the art, wherein the aerodynamic effect achieved in accordance with the state of the art is also illustrated in this figure.

According to the partial perspective top view shown in FIG. 2, in which the viewing direction extends from the wingtip toward the fuselage, the vortex generators 3, 6 are provided for generating a vorticity field that extends over the airfoil 1 and also over the slat 7 provided on the leading wing edge at large angles of attack of the aircraft, i.e., essentially during the takeoff phase and the landing phase. This vorticity field consists of two vortices 11, 12 that induce a downwash zone 10, in which the mixing of the wing boundary layer and the ambient flow is intensified due to the vortexing activity.

The vortex trails 11, 12 and the induced downwash zone 10 illustrated in FIG. 2 merely represent a simplified exemplary conception, wherein the actual flow conditions presumably are even more complex. However, this figure clearly shows that the effect of the downwash zone 10 induced by the vortices 11, 12 is limited to a very narrow area referred to the wingspan direction that lies in the immediate vicinity of the pylon 13. The vortex generators according to the state of the art are designed and arranged in such a way that they influence flow disruptions or flow separations caused by the leading edge of the engine pod or by the intersection between the pylon and the wing. The vortices generated by the vortex generators according to the state of the art accordingly should be locally confined and act in an area extending transverse to the flow direction that is as narrow as possible.

According to the invention (and with reference to FIG. 4), an arrangement of several vortex generators is provided on at least one side S1, S2 of a pod (nacelle) housing 19, wherein said vortex generators are arranged in such a way that the flow along the exterior airflow surface is subjected to laminar vortexing transverse to the flow direction over the most extensive area possible. An area of corresponding width above the airfoil is subjected to vortexing due to the inventive arrangement of several vortex generators on at least one side of the engine pod 20. All of the vortex generators arranged on an engine pod subject, in particular, the boundary layer on the upper side of the airfoil to vortexing over an area that is wider than the engine pod viewed transverse to the flow direction. Due to these measures, a greater angle of attack and therefore an increased maximum lift of the entire wing can be achieved with the same wing.

According to different embodiments,
several vortex generators may be arranged on one side of the engine pod 20 and no vortex generator or no more than one vortex generator may be arranged on the other side or, alternatively,
several vortex generators may be respectively arranged on both sides of the engine pod 20.

In vortex generator arrangements, in which several vortex generators are provided on one side of the engine pod 20 only, these vortex generators may
be arranged on the inner side of the engine pod 2 or
on the outer side of the engine pod 2.

Figure 3:
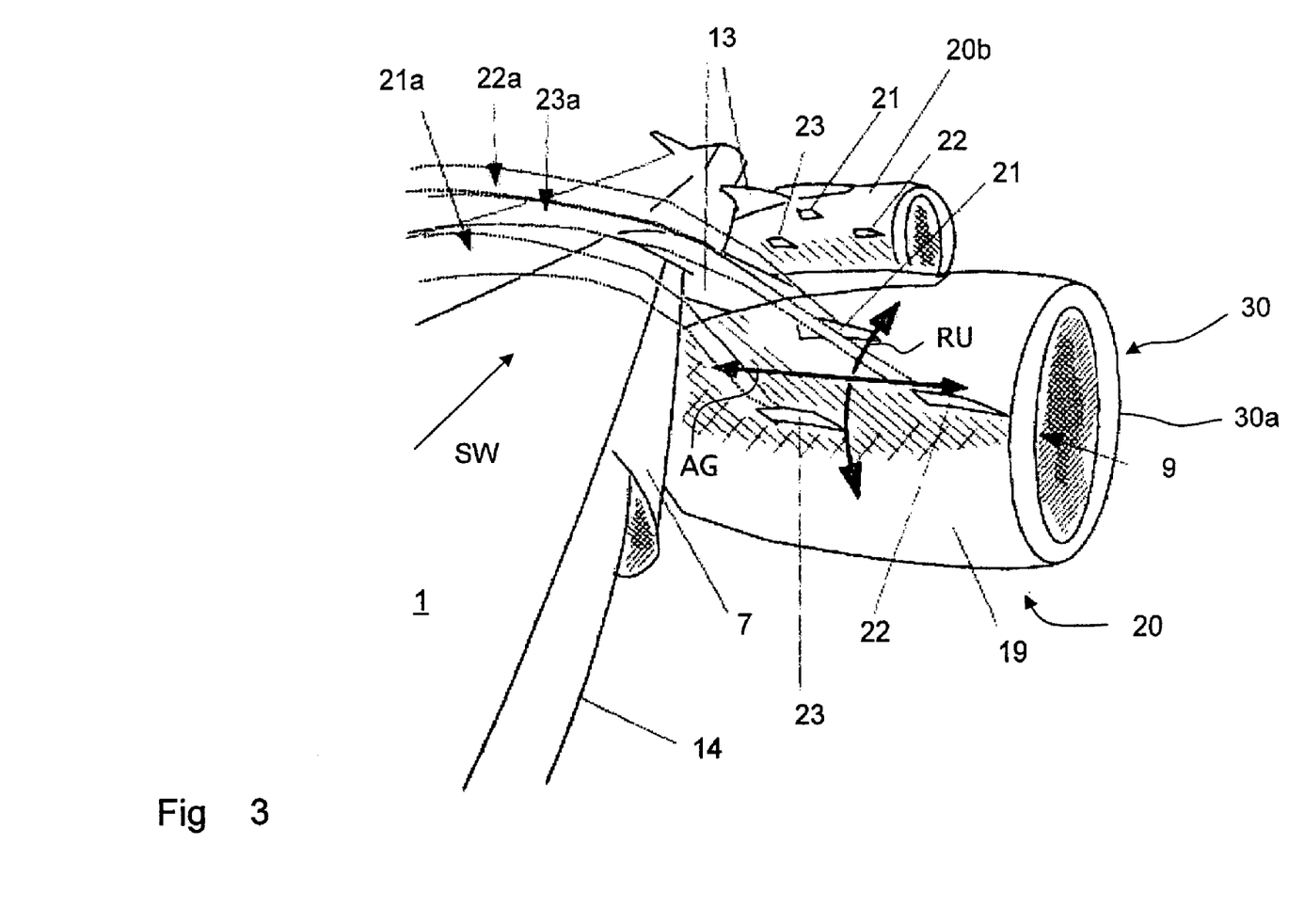
FIG. 3 shows a perspective representation of an airfoil of an aircraft with engines arranged thereon, namely viewed in the direction from the fuselage of the aircraft to the wingtip end, wherein vortex generator arrangements according to one embodiment of the invention are respectively provided on the engine pods.

One embodiment of the inventive vortex generator arrangement is illustrated in FIG. 3 that shows an airfoil 1 of a four-jet commercial aircraft, to which two engine pods 20 are connected that respectively serve for accommodating an engine. The airfoil 1 is viewed in the direction from the aircraft fuselage toward the wingtip in FIG. 3 and arranged on the port side of the aircraft. The engine pods 2 are connected to the airfoil 1 by means of one respective pylon 13. According to this figure, the engine pods 2 of the inner and outer engines are arranged underneath the airfoil 1 in this embodiment in such a way that their front side 30 that is directed opposite to the flow direction is positioned significantly in front of the leading edge 14 of the airfoil referred to the flow direction. In the embodiment shown, three vortex generators 21, 22, 23 are arranged on the inner side of the engine pods 20, i.e., on the side of the engine pods that faces the fuselage, and spaced apart from one another in the longitudinal direction RL and in the circumferential direction RU of the engine pod 20.

In this context, the circumferential direction RU of the engine pod is defined by the angle phi about a longitudinal axis AG of the housing 19 of the engine pod 20. In this case, the longitudinal axis AG may be defined, in particular, as the connecting line between all centroids of the pod housing 19. The longitudinal axis AG may also be identical to the rotational axis of the engine. The angle phi has the value zero at the location of a vertical axis BG of the housing 19. The vertical axis BG may be identical, in particular, to the vertical axis of the aircraft or the wing through-thickness direction. The vertical axis BG of the housing 19 may furthermore be defined, in particular, in such a way that it intersects the longitudinal axis AG and a centerline MP of the pylon. In this respect, it would also be possible to position the vertical axis BG in the respective cross section of the housing 19 that intersects the longitudinal axis at the corresponding location.

In the embodiment illustrated in FIG. 3, a first vortex generator 21 is provided on the first side S1 of the housing 19 of the engine pod 20 or the side that faces the aircraft fuselage, namely near the engine pylon 13 and therefore near the center of the engine pod 20, wherein this first vortex generator generates a first vortex or a first vortex trail 21a that extends over the wing 1 and, if applicable, its slat 7. Referred to the circumferential direction RU of the engine pod 2, a second vortex generator 22 is arranged such that it is downwardly or circumferentially RU spaced apart from the first vortex generator 3, i.e., at a greater angle phi, wherein this second vortex generator generates a similar vortex trail 22a that, however, is clearly offset inward referred to the wingspan direction SW, i.e., toward the longitudinal axis of the aircraft. In the embodiment shown, the two vortex generators 21, 22 are arranged offset toward the rear, i.e., in the flow direction, at a considerable distance from the front end 9 of the engine pod 2 as shown in FIG. 3.

In the embodiment illustrated in FIG. 3, a third vortex generator 23 is provided and, referred to the circumferential direction RU of the engine pod 20, arranged between the first vortex generator 21 and the second vortex generator 22, as well as offset in front thereof, i.e., closer to the front end 9 of the engine pod 20. This third vortex generator 23 generates a third vortex trail 23a that, in turn, extends between the vortex trail 21a of the first vortex generator 21 and the vortex trail 22a of the second vortex generator 22 referred to the wingspan direction SW of the airfoil 1.

In one inventive embodiment, several vortex generators, i.e., at least two vortex generators, are furthermore arranged on the second outer side S2 of the housing or the side of the housing that is directed away from the aircraft fuselage, respectively.

Due to the arrangement of the vortex generators, e.g., the three vortex generators 21, 22, 23 provided on the first side S1 of the housing 19 of the inner engine pod 20 and the vortex generators arranged on the second side of the same housing 19, a flow field consisting of a multitude of vortex trails such as, amongst others, the three vortex trails 21a, 22a, 23a illustrated in FIG. 3 is generated, wherein this flow field extends over an area that, referred to the wingspan direction of the airfoil 1, is significantly larger than the area, over which the vortex trail 11 of the inner vortex generator 3 extends in the conventional arrangement according to FIG. 2.

In the embodiment illustrated in FIG. 3, a similar vortex generator arrangement that also comprises three vortex generators 21, 22, 23 is provided on the engine pod 2 of the outer engine 17. These vortex generators generate flow fields similar to those of the vortex generators on the engine pod 20 that is situated father inward or closer to the fuselage, but these flow fields are not specifically illustrated in the figure in order to provide a better overview.

Several vortex generators are respectively provided on the outer side of the inner and/or outer engine pods 2 that is not visible in FIG. 3, i.e., on the side that is directed away from the aircraft fuselage. These vortex generators also generate vortex trails similar to the vortex trails 21, 22, 23 shown in FIG. 3. The vortex generators on the second side S2 of the respective pod housing 19 may be arranged in a configuration that differs from that of the vortex generators arranged on the first side S1 of the same pod housing 19. In this context, it is possible to take into consideration the geometric relations on the second side S2 of the pod housing 19 that differ from those on the first side S1 due to the wing sweep. The vortex generators on one side S1 of the pod housing 19 may, however, also be arranged symmetrical to vortex generators (if a different number of vortex generators is provided on the sides S1, S2) or to the vortex generators on the second side S2 of the same pod housing 19 and vice versa.

When observing the two sides S1, S2 of a pod housing 19, it becomes clear that the same number of vortex generators or a different number of vortex generators may be provided on these sides S1, S2. Depending on the respective application, the arrangement of two or more than two vortex generators may also be realized identically or differently on these two sides S1, S2.

The invention is suitable for use in aircraft with one or more engines or pod housings on each side of the aircraft or on each airfoil 1, respectively. In an aircraft that features two engines or pod housings 19 on each side as in the embodiment illustrated in FIG. 3, it is possible to respectively provide the first side S1 of each pod housing 19, i.e., of the inner pod housing and the outer pod housing, with an arrangement and/or number of vortex generators that is identical or similar to that on its second side S2. In the embodiment illustrated in FIG. 3, the same number and the same arrangement of vortex generators 21, 22, 23 are provided on the first sides S1 of the inner and of the outer pod housing 19. Depending on the respective application, the arrangement on the engine pod 2 of the outer engine 17 may also differ from that on the inner engine 16.

However, it would naturally also be possible to choose positions other than those illustrated for purely exemplary purposes in FIG. 3 for the vortex generators 21, 22, 23. It is also possible to provide an arrangement of more than three vortex generators on one side or on both sides of the pod housing 19. A suitable arrangement can be determined based on the geometric conditions and the aerodynamic design of the respective aircraft.

Figure 4:
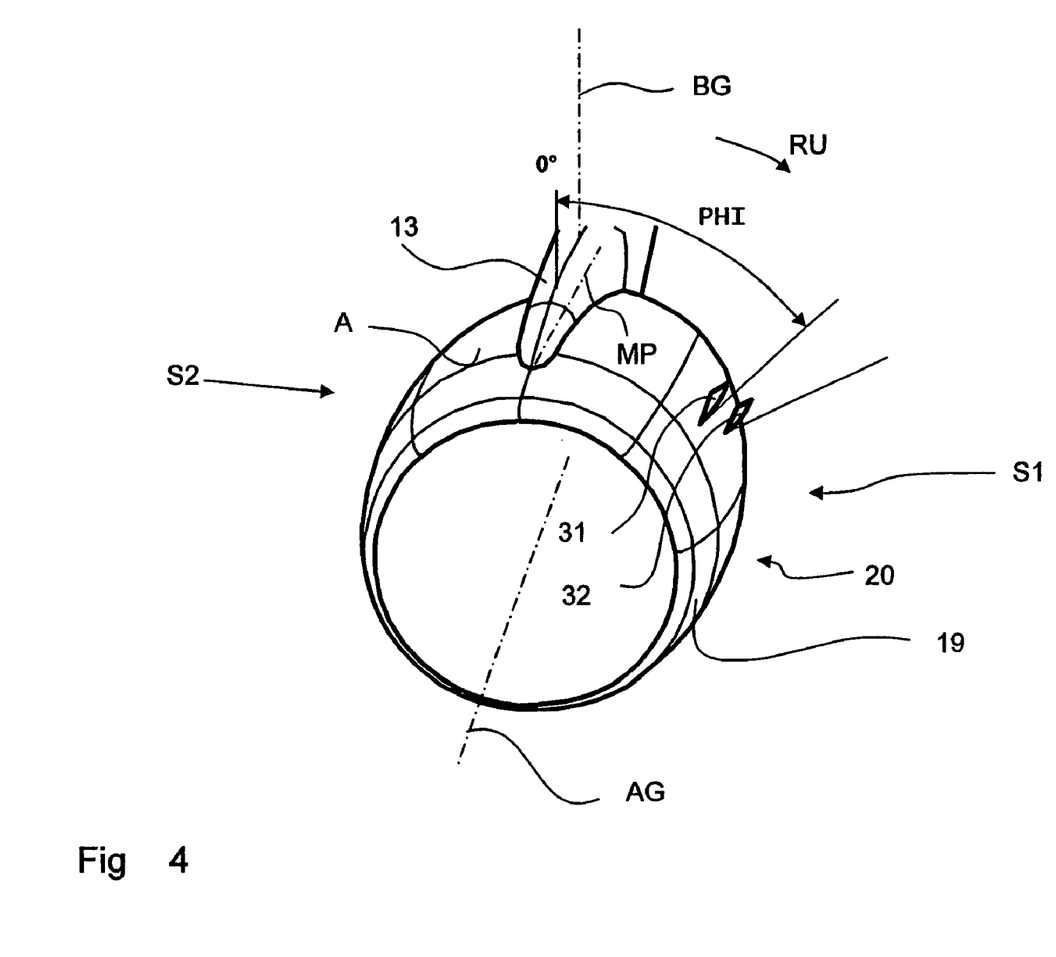
FIG. 4 shows a perspective representation of an engine pod with another embodiment of an inventive arrangement of two vortex generators provided on one side thereof, wherein only the vortex generators on a first side of the pod housing are illustrated in this figure.
Figure 5:
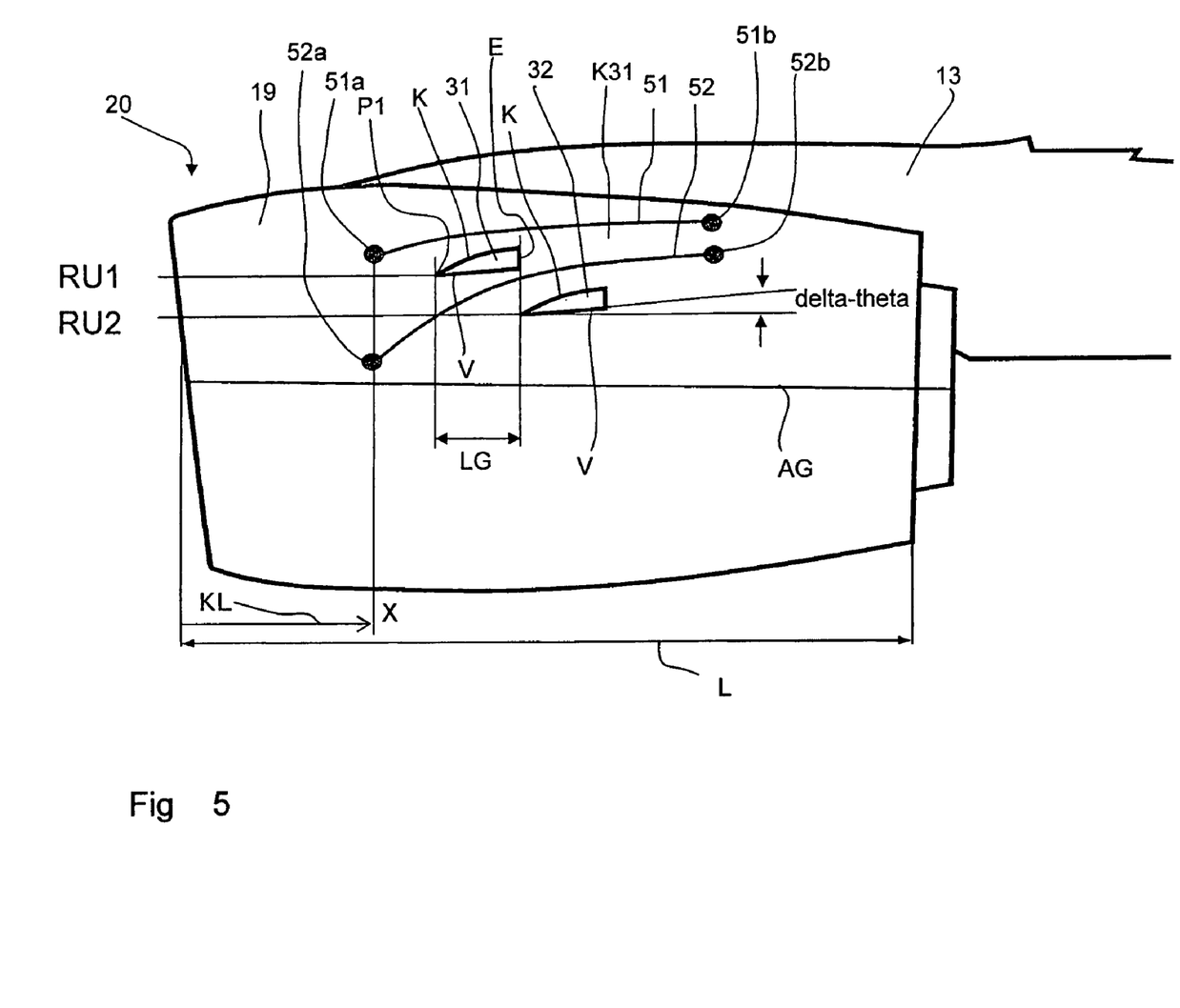
FIG. 5 shows a side view of the engine pod according to FIG. 4 with an inventive arrangement of two vortex generators.

In the embodiments of engine pods illustrated in FIGS. 4 and 5, two vortex generators are respectively arranged on the first side S1. Inventive embodiments for the arrangement of vortex generators are described with reference to this illustration:

In one embodiment, the foremost geometric point of a vortex generator may be positioned within a positioning corridor K31 that lies between two boundary lines, wherein the point of origin 51a of the first boundary line 51 is the point on the circumference of the engine pod with the circumferential engine pod angle phi=35 degrees and the longitudinal engine pod coordinate X=L/4, the end point 51b of the first boundary line 51 is the point on the circumference of the engine pod with the circumferential engine pod angle phi=25 degrees and the longitudinal engine pod coordinate X=L·⅔, the point of origin 52a of the second boundary line 52 is the point on the circumference of the engine pod with the circumferential engine pod angle phi=90 degrees and the longitudinal engine pod coordinate X=L/4 and the end point 52b of the second boundary line 52 is the point on the circumference of the engine pod with the circumferential engine pod angle phi=55 degrees and the longitudinal engine pod coordinate X=L·⅔.

In this case, the boundary line respectively is the shortest line between its point of origin and its end point that extends on the outer circumference of the engine pod. In this context, the term longitudinal engine pod coordinate KL refers to a coordinate along the longitudinal axis AG of the pod housing, wherein the longitudinal coordinate KL of a point on the outer surface of the pod housing results from the vertical plane that extends through this point and is defined by the longitudinal axis AG. The point of origin of the longitudinal coordinate KL may consist, in particular, of the intersecting point between the longitudinal axis AG and the surface that contains the border line of the front end 30a of the pod housing. The point of origin of the longitudinal coordinate KL is the intersecting point between the inlet plane of the pod housing 19 and the longitudinal axis AG.

This corridor K31 is provided for the foremost geometric point P1 (circumferential position RU1) of the first vortex generator 31 or the top vortex generator referred to the circumferential direction RU, i.e., the vortex generator that has the position with the smallest angle phi. The second vortex generator 32 is situated underneath the first vortex generator referred to the circumferential direction RU and spaced apart therefrom by a circumferential engine angle of phi=10 to 30 degrees.

If two vortex generators are arranged on one side S1, S2 of the pod housing, the overall size of the combination or arrangement of vortex generators in the circumferential direction RU is not greater than delta-phi=30° in one embodiment. In another embodiment, two vortex generators that are arranged adjacent to one another in the circumferential direction RU are also not spaced apart from one another by more than delta-phi=30°. In this case, the longitudinal dimension of the combination can also be limited by overlapping the vortex generators in the longitudinal coordinate KL.

Referred to the longitudinal coordinate KL, two vortex generators can be respectively arranged in an overlapping fashion in their longitudinal direction. This may apply, in particular, to the two vortex generators that are arranged adjacent to one another in the circumferential direction RU. The overlap amounts, in particular, up to 50% of the longitudinal dimension of the respective front vortex generator. Two vortex generators, particularly the two vortex generators arranged adjacent to one another in the circumferential direction RU, may also be respectively spaced apart from one another with respect to the longitudinal coordinate KL. In one preferred embodiment, this distance amounts to no more than 50% of the longitudinal dimension of the respective front vortex generator.

These specifications also apply to the arrangement of more than two respective vortex generators on one side S1, S2 of the pod housing. In this case, the respective adjacent vortex generators referred to the longitudinal coordinate KL or the circumferential direction RU do not have to be taken into consideration.

In the embodiment illustrated in FIG. 5, a second vortex generator 32 is installed underneath the first vortex generator 31, wherein the X-coordinate of its front point (circumferential position RU2) coincides with the end E of the first vortex generator in the longitudinal direction of the pod housing 19 (±10% of the length of the vortex generator) and therefore lies at approximately ½ the pod length. The radial angle of the second generator amounts to phi=75° in this case.

Depending on the special aircraft geometry, the front point P1 of the first vortex generator 31 may also lie farther downstream in the corridor K31. Due to this measure, the first vortex generator lies in an area of the pod 20 that experiences a strong upflow at large angles of attack of the aircraft and therefore is subjected to a significant local angle of attack. This is the case in an essentially lateral position (phi≧45°), wherein offsets toward the rear by more than ⅔ of the length L of the engine pod 20 should not be considered.

The foremost vortex generator should not be arranged at a location that is spaced apart from the point of origin of the longitudinal coordinate KL by less than ¼ of the length L of the engine pod.

The vortex generators are realized in a fin-shaped fashion and feature a connecting region V that forms the structural transition to the exterior airflow surface A of the pod housing 19. The length LG of the vortex generators referred to their longitudinal direction is defined, in particular, by the length of the connecting region and its intersecting line with the center line of the vortex generator. The longitudinal direction of the vortex generator extends from the side facing the flow to the opposite side. The center line of the vortex generator results from the centroidal lines of the cross sections of the vortex generator transverse to the flow direction. Each vortex generator furthermore has an outer contour K that protrudes from the exterior airflow surface A of the pod housing 19.

Figure 6:
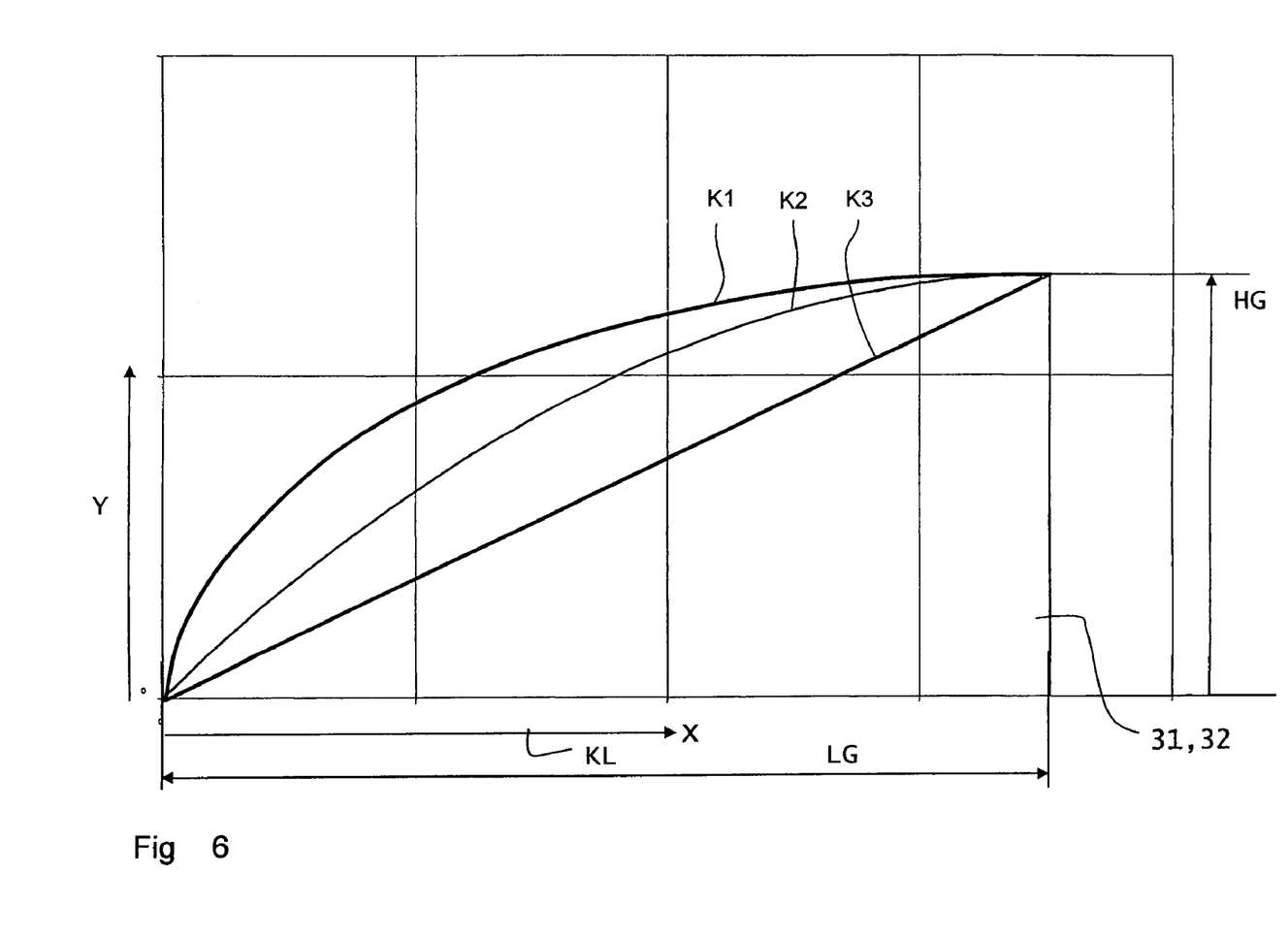
FIG. 6 shows a diagram for elucidating the geometric characteristics that define the shape of one embodiment of an inventive vortex generator.

According to the invention, the outer contour K of one embodiment of the vortex generator extends over the connecting region V in a continuously ascending fashion, namely from the exterior airflow surface A of the pod housing to a maximum height HG at the rear end of the respective vortex generator (line K2 in FIG. 6).

The outer contour K of a vortex generator may also be realized in the form of a straight line (line K3 in FIG. 6).

Alternatively, the outer contour K of a vortex generator may also be realized in the form of a quarter ellipse (line K1 in FIG. 6).

Furthermore, the outer contour K of the vortex generator that protrudes from the exterior airflow surface A may, referred to the geometric path of the connecting region (V) in the longitudinal direction X of the vortex generator, be defined by the function $$Y = HG \cdot [1 - (LG - X)^2 / LG^2],$$

wherein:

X is the longitudinal coordinate of the vortex generator with an overall length LG of the vortex generator and Y is the vertical coordinate of the vortex generator with a maximum height HG of the vortex generator relative to the exterior airflow surface (A) at the longitudinal coordinate X=LG, and wherein the outer contour K1 that protrudes from the exterior airflow surface A lies in an area that corresponds to ±10% of the Y-value resulting from the function.

Each of the vortex generators arranged on a pod housing 19 may be realized, in particular, in accordance with one of these embodiments. The vortex generators of one side S1, S2 of a pod housing particularly may have the same shape.

Although the ratio between the length of the vortex generator and the pod length is also individually dependent on the respective application, it typically amounts to approximately 10% to 15%.

An engine pod is mounted underneath and in front of an airfoil. The piercing point of the engine axis through the outlet plane of the fan flow approximately lies at the leading edge of the airfoil (that is not directly visible in the figures) in a top view.

The longitudinal direction of the vortex generators may be angled, in particular, relative to the longitudinal axis of the engine pod by delta-theta=0 to 10 degrees. In this case, the angle of the vortex generator is chosen in such a way that the rear end of the vortex generator lies above its front point referred to the engine axis. The longitudinal angle of the vortex generator is chosen such that the least drag possible occurs while cruising.

The vortices generated by the vortex generators are guided over the wing by the airflow around the engine-wing combination. In this case, the absolute position of the first vortex generator, as well as the positions of other vortex generators relative to the first vortex generator, are decisive for the desired propagation of the "vortex trail" in the wingspan direction and consequently for the effect on the maximum lift.

The adaptation of the vortex generator positions in the wind tunnel can be realized interactively, particularly by measuring the vortex positions above the wing (follow-up measurements). Flow calculations can already be used for optimizing purposes prior to the wind tunnel tests by determining the global flow field and therefore the potential vortex positions.

The vortex generators provided in accordance with the invention are realized in the form of fins. Referred to the longitudinal axis of the pod housing AG, the fins may extend parallel to this longitudinal axis AG or be angled relative to this longitudinal axis AG of the engine pod 2. The shape and the position of the individual vortex generators are chosen such that a vorticity field of growing intensity is generated as the angle of attack of the aircraft increases. The vortex generators are realized, in particular, in the form of fins, wherein their longitudinal plane or center plane or plane of symmetry is arranged radially or angularly to the radial direction of the pod housing referred to the longitudinal axis AG thereof.

The vortex generators of the inventive arrangement can be installed during the construction of a new aircraft or an existing aircraft can be advantageously retrofitted therewith. The vortex generators may be realized, in particular, integrally or in one piece with the pod housing 19 or in the form of a component that can be mounted on the pod housing.

The invention claimed is:

1. An engine pod for an aircraft that features a pod housing with a first and a second side and several fin-shaped vortex generators that are arranged on a first side of the pod housing in such a way that the overall vorticity field generated by said vortex generators extends over an increasing airfoil area in the wingspan direction as the angle of attack increases in order to improve the maximum lift, wherein the foremost point of a first vortex generator lies within a positioning corridor that is situated between two first-side boundary lines, wherein a circumferential engine pod angle phi is measured about a longitudinal axis of the pod housing with the circumferential engine pod angle phi being 0 at a vertical axis of the pod housing, wherein L is a length of the pod housing along a longitudinal axis of the pod housing, wherein a longitudinal pod coordinate X is measured along the longitudinal axis of the pod housing starting from a front end of the pod housing, wherein the point of origin of the first first-side boundary line is the point on the circumference of the engine pod with the circumferential engine pod angle phi=35 degrees and the longitudinal engine pod coordinate X=L/4, the end point of the first first-side boundary line is the point on the circumference of the engine pod with the circumferential engine pod angle phi=25 degrees and the longitudinal engine pod coordinate X=L·⅔, the point of origin of the second first-side boundary line is the point on the circumference of the engine pod with the circumferential engine pod angle phi=90 degrees and the longitudinal engine pod coordinate X=L/4 and the end point of the second first-side boundary line is the point on the circumference of the engine pod with the circumferential engine pod angle phi=55 degrees and the longitudinal engine pod coordinate X=L·⅔, and wherein the first-side boundary line respectively is the shortest line between its point of origin and its end point that extends on the outer circumference of the engine pod.

2. The engine pod according to claim 1, wherein the first side of the pod housing faces the fuselage.

3. The engine pod according to claim 1, wherein at least one fin-shaped vortex generator is arranged on a second side of the pod housing.

4. The engine pod according to claim 3, wherein several fin-shaped vortex generators are arranged on the second side of the pod housing, wherein the foremost point of a first vortex generator of the several fin-shaped vortex generators arranged on the second side of the pod housing respectively lies within a positioning corridor that is situated between first and second second-side boundary lines, wherein the point of origin of the first second-side boundary line is the point on the circumference of the engine pod with the circumferential engine pod angle phi=35 degrees and the longitudinal engine pod coordinate X=L/4, the end point of the first second-side boundary line is the point on the circumference of the engine pod with the circumferential engine pod angle phi=25 degrees and the longitudinal engine pod coordinate X=L·⅔, the point of origin of the second second-side boundary line is the point on the circumference of the engine pod with the circumferential engine pod angle phi=90 degrees and the longitudinal engine pod coordinate X=L/4 and the end point of the second second-side boundary line is the point on the circumference of the engine pod with the circumferential engine pod angle phi=55 degrees and the longitudinal engine pod coordinate X=L·⅔, and wherein the second-side boundary line respectively is the shortest line between its point of origin and its end point that extends on the outer circumference of the engine pod.

5. The engine pod according to claim 1, wherein a second vortex generator of the several fin-shaped vortex generators is positioned underneath the first vortex generator by a circumferential engine angle phi=10 to 30 degrees.

6. The engine pod according to claim 1, wherein the vortex generators are arranged in an overlapping fashion in the longitudinal direction.

7. The engine pod according to claim 1, wherein the longitudinal direction of the vortex generators is angled relative to the longitudinal axis of the engine pod by delta-theta=0 to 10 degrees.

8. The engine pod according to claim 1, wherein the vortex generators have a length that extends in the longitudinal direction of the vortex generator in a connecting region with the exterior airflow surface of the pod housing, and wherein the vortex generators have an outer contour that protrudes from the exterior airflow surface and extends in a continuously ascending fashion from the exterior airflow surface of the pod housing to its maximum height at the rear end of the respective vortex generator above the connecting region.

9. The engine pod according to claim 8, wherein the outer contour of at least one vortex generator is realized in the form of a straight line.

10. The engine pod according to claim 8, wherein the ratio between the overall length and the maximum height of the vortex generator lies between 1.4 and 3.6.

11. The engine pod according to claim 8, wherein the overall length of the vortex generator referred to the length of the engine pod lies between 0.1 and 0.15.

12. An engine pod for an aircraft that features a pod housing with a first and a second side and several fin-shaped vortex generators that are arranged on one of the first and second sides in such a way that the overall vorticity field generated by said vortex generators extends over an increasing airfoil area in the wingspan direction as the angle of attack increases in order to improve maximum lift, wherein the outer contour of the vortex generator that protrudes from the exterior airflow surface of the pod housing is, referred to the geometric path of the connecting region in the longitudinal direction of the vortex generator, defined by the function $Y=HG \cdot [1-(LG-X)^2/LG^2]$, wherein:

X is the longitudinal coordinate of the vortex generator as measured from a front of the vortex generator towards a front of the pod housing with an overall length LG of the vortex generator as measured in a longitudinal direction of the vortex generator and Y is the vertical coordinate of the vortex generator with a maximum height HG of the vortex generator relative to the exterior airflow surface at the longitudinal coordinate X=LG, and wherein the outer contour that protrudes from the exterior airflow surface lies in an area that corresponds to ±10% of the Y-value resulting from the function.

13. The engine pod according to claim 12, wherein the surface of the fins forming the vortex generators are arranged radially referred to the engine pod.

* * * * *